(12) United States Patent
Pomeroy et al.

(10) Patent No.: US 7,934,224 B2
(45) Date of Patent: Apr. 26, 2011

(54) METHOD, INTERFACE AND APPARATUS FOR DISCOVERING A LOCATION OF A DEVICE

(75) Inventors: Stephen Pomeroy, Somerville, MA (US); Pascal Chesnais, Sudbury, MA (US); John Watlington, Acton, MA (US); Patrick Sean Wheeler, Cambridge, MA (US)

(73) Assignee: France Telecom, Paris (FR)

( * ) Notice: Subject to any disclaimer, the term of this patent is extended or adjusted under 35 U.S.C. 154(b) by 970 days.

(21) Appl. No.: 11/771,925

(22) Filed: Jun. 29, 2007

(65) Prior Publication Data

US 2009/0106778 A1    Apr. 23, 2009

(51) Int. Cl.
*G06F 13/00*    (2006.01)
(52) U.S. Cl. ............ 719/328; 455/414.2; 455/456.2
(58) Field of Classification Search .......... 719/328; 455/414.2, 456.2
See application file for complete search history.

(56) References Cited

U.S. PATENT DOCUMENTS

| | | | | |
|---|---|---|---|---|
| 7,151,939 | B2 * | 12/2006 | Sheynblat | 455/456.1 |
| 7,336,964 | B2 * | 2/2008 | Casey | 455/456.3 |
| 7,412,236 | B1 * | 8/2008 | Blight et al. | 455/426.1 |
| 7,532,899 | B2 * | 5/2009 | Wilson et al. | 455/456.3 |
| 2004/0160909 | A1 * | 8/2004 | Sheynblat | 370/328 |
| 2008/0214161 | A1 * | 9/2008 | Jakl | 455/414.2 |
| 2009/0075675 | A1 * | 3/2009 | Kim et al. | 455/456.2 |

OTHER PUBLICATIONS

Jeffrey Hightower et al., Practical Lessons from Place Lab, IEEE Pervasive Computing magazine, Sep. 2006, IEEE.
Colm McMullan et al., PlaceLab Geopositioning System, Downloaded from Internet site "ntrg.cs.tcd.ie/undergrad/4ba2.05/group1/index.html" on Jun. 16, 2007.
Tony Rees, C-Squares, A New Spatial Indexing System And Its Applicability To The Description Of Oceanographic Datasets, Oceanography, vol. 16, No. 1/2003, pp. 11-19, January.
Ingrid Håkansson et al., Position Yourself With LBS, Downloaded from Internet site "ericsson.com/mobilityworld/sub/articles/other_articles/nl04apr07" on Jun. 16, 2007.

* cited by examiner

*Primary Examiner* — Andy Ho
(74) *Attorney, Agent, or Firm* — Thorne & Halajian, LLP; Gregory L. Thorne (57) ABSTRACT

A system, method, Application Programming Interface (API) and device for discovering a location of a device, for example, to provide location information for a Location Based Service (LBS). The device includes a memory, a display, and a processor operably coupled to the memory and the display. The processor may be arranged to provide a user interface (UI) on the display, retrieve location cues in response to a location request, forward location cues to a location server and receive location information back from the location server. The location information may be a location query page associated with a new place ID if the location cues do not correspond to the location server cues or the location information may be a previously discovered place ID associated with the server location cues if one or more of the location cues correspond to one or more of the server's location cues.

25 Claims, 7 Drawing Sheets

METHOD, INTERFACE AND APPARATUS FOR DISCOVERING A LOCATION OF A DEVICE

FIELD OF THE PRESENT SYSTEM

The present system relates to a method and apparatus for identifying and sharing a device's location to enable location based services.

BACKGROUND OF THE PRESENT SYSTEM

In consumer-focused internet services, user-provided location information along with mapping services is used by internet portals and other service providers to present or organize information for the consumer, in a technology area referred to as location-based services (LBS). Though these services have relied on user-supplied location information, especially on the desktop, mobile services are coming to market that utilize user location available from the network or collected from a user device.

Even before the popularization of LBS, a device's location in a communications network has always been implicitly available. A radio-based point-to-point communications network, such as a cell-phone network, must be able to uniquely identify the mobile device (e.g., cellular phone) and a general coverage area in which the mobile device is located. Every cell phone needs to know a unique identifier of the cell tower that it communicates with to enable the cell phone to place and receive calls successfully. This identifier is known as the cell tower ID and is kept unique by the various carriers. Through identification of the cell tower, termed cell ID positioning, location-based technologies may be employed, however, the technology is not very accurate. At best, one cannot even get building-level accuracy with basic cell ID positioning. A cell ID that uniquely identifies a user is therefore always known, and from this a point-and-radius description of device location may be determined. Device location in a mobile network may be more accurately determined if needed by triangulating the mobile device with known locations in a network infrastructure.

For growing mobile location-based services, a communications network becomes a source of readily-available, secure, but potentially inaccurate device location data. As network requirements and capabilities have varied, the resolution and accuracy of endpoint locations have varied according to design and performance requirements of the network. Nevertheless, device location information has been closely guarded by network operators for fear of compromising customer privacy. The emerging danger is that industry's previous diligence in protecting location information may be soon overwhelmed by the explosion of location-aware devices.

In order to obtain real-time accuracy and resolution, handsets can be built with Global Positioning System (GPS) equipment. As GPS chips become cheaper, mobile handset manufacturers are able to provision even low-end handsets, laptops, or external cards with the GPS chips. However, once this information acquired off-network is sent to third parties, through applications such as Google's mapping software, there is no guarantee how this information will be used.

Network operators should not ignore the potential risks and opportunities of a mobile computing future where device location and thereby user location, will be available to third party services, even if the operator does not directly provision this information. The potential competitive advantage of the network operator is the fact that location information based on cell ID is easier to provision from the end-user's perspective than other alternatives.

In the enterprise arena, it is argued that LBS will only take root once standards have matured for enterprise computing. A need for LBS standards to ensure interoperability between applications and services is being pursued in organizations such as the Open Mobile Alliance (OMA). In this arena, the most important standard is Mobile Location Protocol (MLP), which defines data standards, authentication and access standards for LBS.

However, MLP alone does not provide support for modeling relative descriptions of location. Furthermore, MLP alone does not provide data in a distributed fashion, where servers can share location data as needed, instead of relying on a single server as an information source.

Many of these attempts at providing LBS are hampered in that given sources of location information are not always available. GPS devices are useful for identifying a devices position, expressed as a latitude and longitude coordinate pair, when the device is located outside of structures in rural areas where neighboring structures do not provide an impediment to receiving sufficient satellite transmissions to identify the devices location. However, oftentimes in urban areas or inside of buildings, a mobile devices position based on GPS may not be available. Other sources of location information may be available in these areas, such as through identification of a location of Access Points (APs) or cellular towers which the mobile device is associated with, yet these same sources of location information may be unavailable in rural areas where there sources may be too widely distributed to be of use in discerning the mobile devices location.

A system exists to utilize location information that may be obtained from one or more devices. The location information may be determined by the device listening for wireless network base-stations and then looking up coordinates for the wireless network base-stations in a data file that is downloaded from a central server. By triangulation utilizing the base-stations locations, the device may determine an approximation of its position. While this system enables a local determination of a given geographic location of a device, it provides no guidance of how to build a database to correlate different geographic locations. The system also does not enable sharing the location information so that other devices may benefit from the determination. In addition, locations are provided with unique identifiers that may only be meaningful to a given user and therefore, the names may not be useful to other users even if they could be shared.

Location information collected from prior networks is commonly not continuous and/or accurate to an arbitrary degree of resolution. Further, an LBS that requires real-time accuracy and resolution may benefit by not relying solely on network sources.

Accordingly, a need exists to discern and share a device's location that transcends any one particular source of location information to facilitate LBS deployment.

It is an object of the present system to overcome disadvantages and/or make improvements in the prior art.

SUMMARY OF THE PRESENT SYSTEM

The present system includes a system, method, Application Programming Interface (API) and device for discovering a location of a device, for example, to provide location information for a Location Based Service (LBS). The device includes a memory, a display, and a processor operably coupled to the memory and the display. In accordance with an embodiment, the processor is arranged to provide a user interface (UI) on the display, retrieve location cues in response to a location request, forward location cues to a location server and receive location information back from the location server. The location information may be a location query page associated with a new place ID if the location cues do not correspond to the location server cues or the location information may be a previously discovered place ID associated with the server location cues if one or more of the location cues correspond to one or more of the server's location cues.

In one embodiment, the server location cues and corresponding place IDs may be stored at the device. The locally stored location cues may be queried prior to forwarding the location cues to the location server. A previously discovered place ID associated with the location cues stored locally may be returned as the location information if the location cues correspond to one or more of the local location cues. Any of the location cues that do not correspond to local location cues may be associated with the previously discovered place ID if one or more of the location cues correspond to one or more of the local location cues. The associated one or more of the location cues that do not correspond to one or more of the local location cues may be forwarded to the location server.

The location cues may include one or more of a GPS sensor, a Radio Frequency Identification (RFID) transmitter, a location services system, a mobile operator system, and a wireless access point. In one embodiment, the location cues include two or more of the GPS sensor, the RFID transmitter, the location services system, the mobile operator system, and the wireless access point.

In accordance with an embodiment, the location cue that includes absolute location information may be converted into a bounding area designation, such as a C-Square designation that encompasses the absolute location information. In one embodiment, the bounding area designation may be expanded and compared and the expanded bounding area designation may be compared to the location cues. In this embodiment, the previously discovered place ID may be returned if the expanded bounding area designation corresponds to one or more of the local or server based location cues.

The location cues may include temporal cues related to a time of acquiring the location cues and/or user identification information identifying a user that is associated with the location cues. The location cues may include a context that is utilized to determine a location resolution of the previously discovered place ID. In one embodiment, if two or more of the location cues correspond to different place IDs, the different place IDs may be merged into one place ID that is associated with the location cues of the different place IDs. The LBS may be a local LBS or may form a portion of an LBS that is accessed over a wireless network. In an embodiment wherein the LBS is a local LBS, the LBS may be a location aware call log that provides a record of calls placed at the previously discovered place ID. In another embodiment, the location information may be utilized during a web browsing function, wherein the previously discovered place ID is forwarded by the device to a web page currently being viewed by the device such that the web page view is customized based on the previously discovered place ID.

In one embodiment, the present system may include an Application Programming Interface (API). The API may include a portion to receive location cues from a device as a portion of a request for location information, a portion to compare the location cues to a database of location cues, a portion to return a location query page associated with a new place ID if the location cues do not correspond to the database location cues, and a portion to return a previously discovered place ID associated with the database location cues and arranged to associate any of the location cues that do not correspond to database location cues with the previously discovered place ID if one or more of the location cues correspond to one or more of the database location cues. The previously discovered place ID may be shared with a further device in response to a location request from the further device that includes one or more location cues that correspond to one or more of the database location cues that correspond to the previously discovered place ID. The database of location cues may operate as a place server that is remote from the device and/or may be resident at the device. The remote place server may be a distributed place server wherein if the location cues do not correspond to database location cues at one of the distributed place servers, the location request is forwarded to another one of the distributed place servers. In accordance with an embodiment of the present system, a method including acts may operate similar as any of the embodiments described herein.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, modeling tools, analysis techniques and methods are omitted so as not to obscure the description of the present system. It should be expressly understood that the drawings are included for illustrative purposes and do not represent the scope of the present system.

The present system is enabled to make inferences based on co-location, shared knowledge, and proximity in a heterogeneous environment. The complexity of how to correlate divergent sources of location information is performed by a central server. The present system enables location based services to utilize location information from multiple location information sources in a simple yet extensible manner without a need to compensate for idiosyncratic characteristics in the service itself.

Figure 1:
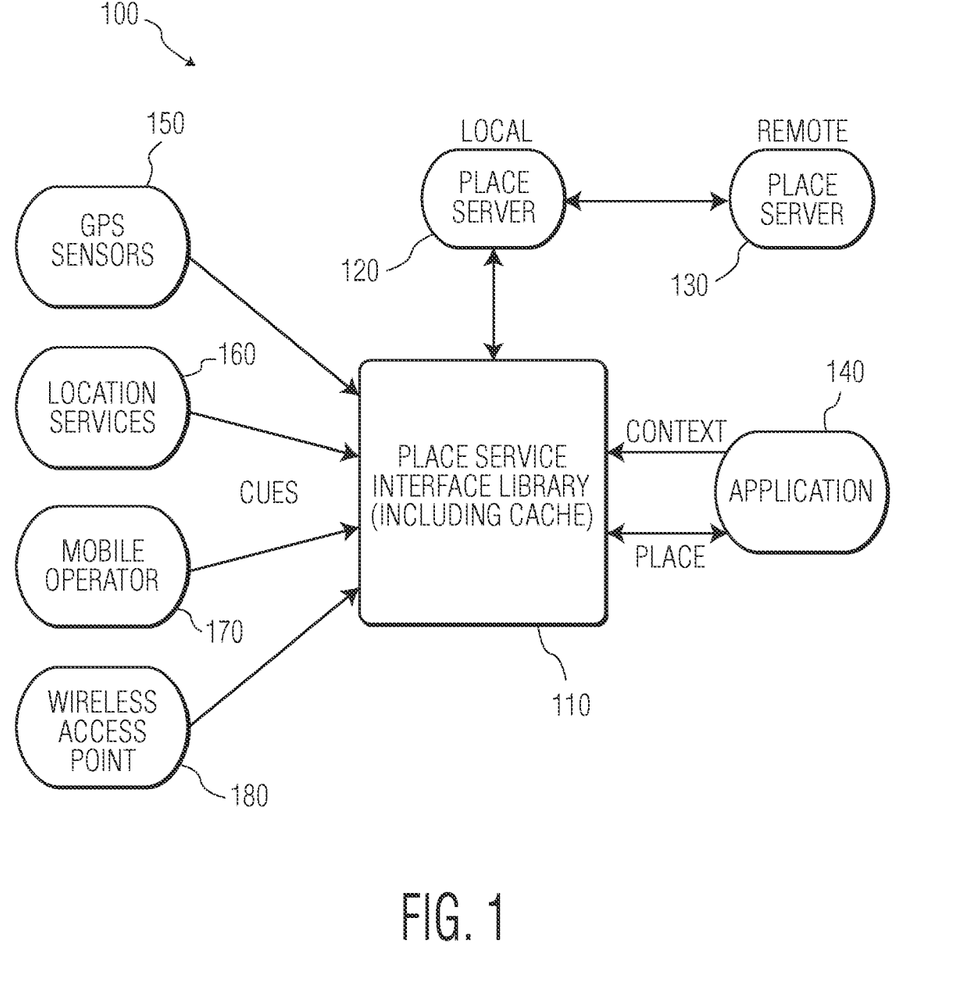
FIG. 1 shows a system in accordance with an embodiment of the present system.

FIG. 1 shows a system 100 in accordance with an embodiment of the present system. The system 100 includes a place server interface library 110 which is operably coupled to a local place server 120, devices that provide location cues such as a GPS sensor 150, location services 160, a mobile operator 170, a wireless Access Point (AP) 180 and a location based service application 140. A cue may further include location information entered directly by the user (e.g., information such as "I am at x degrees latitude and y degrees longitude", "I am at the southwest corner of Third Street and Main Street", etc.). Accordingly, the term cue as utilized herein may include one or more of these sources of location cues. Further, for purposes of simplifying a description of the present system, the term operably coupled and formatives thereof as utilized herein refer to an interconnection that enables the related portions to operate in accordance with the present system. An operable coupling may include elements such as a wireless coupling (e.g., a wireless cellular communication coupling, a WiFi coupling), a wired coupling, an optical coupling and other communication couplings including combinations thereof, for example utilizing land-line protocols, network protocols, and/or combinations thereof. In the illustrative embodiment shown, the local place server is operably coupled to a remote place server 130 that may operate as a central server for providing location information to the local place server 120. For example, the remote place server 130 may be accessible over a network link, such as an Internet connection. In addition, the remote place server 130 may be a distributed server representing multiple service sites that collaborate to provide the location information to the local place server. For example, when location information requested by the local place server 120 is not available from one of the remote place servers, a request may be generated to retrieve the location information from a further place server.

Each of the place server interface library 110, the local place server 120, the remote place server 130, the GPS sensor 150, location services 160, the mobile operator 170, the wireless AP 180 and the location based service application 140 may include hardware portions, software portions (e.g., programming instructions) and/or combinations thereof. The local place server 120 operates to provide location information to the place server interface library 110 when location information is requested by a user. The request for location information may be explicit, such as generated by a user operating within a user interface to explicitly request location information ("e.g., "Where am I?") and/or may be implicit such as through interaction with an LBS. In another embodiment, a device in accordance with the present system may initiate a request for location information ever time an operation is performed. For example, a cell phone may make a request for location information each time a call is placed. Further, the request may be implicit in an interaction with the application 140 that includes and/or that utilizes location information.

The devices, such as the place server interface library 110, the local place server 120, the remote place server 130, the GPS sensor 150, location services 160, the mobile operator 170, the wireless AP 180 and the location based service application 140 may include a processor operationally coupled to a memory, a display, and/or a user input device. The interconnections between these may be a wired, wireless, optical, and/or other system or combination thereof for transferring data there between.

The one or more memories may be provided to each of the place server interface library 110, the local place server 120, the remote place server 130, location services 160, the mobile operator 170, and the location based service application 140. The one or more memories may be any type of device for storing programming application data, such as to support a user interface (e.g., GUI provided by the place service interface library 110), as well as other data, such as location data, etc. The programming application data and other data are received by the one or more processors for configuring the one or more processors to perform operation acts in accordance with the present system. The operation acts may include controlling a display to display a user interface (UI), such as a graphical user interface (GUI), for user interaction with the present system, interaction with the application 140, etc. Interaction with the UI may be provided by a keyboard, mouse, trackball, accelerometer or other device, such as a touch sensitive display, which may be stand alone or be a part of a system, such as part of a personal computer, personal digital assistant, a rendering device (e.g., MP3 player) and/or display device for communicating with the one or more processors via any type of link, such as a wired or wireless link. The user input device is operable for interacting with the processor including interaction within a paradigm of a GUI for interaction with elements of the present system, such as a request for a LBS. Clearly the one or more processors, memories, displays, and/or user input devices may all or partly be a portion of a computer system, such as a mobile device (e.g., cell phone, personal digital assistant (PDA), portable personal computer, etc.). The methods of the present system are particularly suited to be carried out by a computer software program, such program containing modules corresponding to one or more of the individual steps or acts described and/or envisioned by the present system. Such program and elements thereof may of course be embodied in a computer-readable medium, such as an integrated chip (e.g., cache of the place service interface library 110), a peripheral device or memory, and/or other one or more memories coupled to the one or more processors.

One or more of the memories may be any recordable medium (e.g., RAM, ROM, removable memory, a hard drive, floppy disk, an optical storage medium, such as a CD-ROM, DVD, or memory cards) or may be a transmission medium (e.g., a network comprising fiber-optics, the world-wide web, cables, a wireless channel using time-division multiple access, code-division multiple access, other radio-frequency and/or wireless communication channel). Any medium known or developed, or combinations thereof, that may store and/or transmit information suitable for use with a computer system, processor, etc., may be used as one or more of the memories. Moreover, the term "memory" should be construed broadly enough to encompass any information able to be read from or written to an address in an addressable space accessible by a processor. With this definition, information on a network is still within the memory, for instance, because the processor may retrieve the information from the network for operation in accordance with the present system. These memories may configure the processor to render the GUIs and implement the methods, operational acts, and functions disclosed herein. The memories may be distributed or local and the processor, where additional processors may be provided, may also be distributed or may be singular. For example, the GUI may be embedded in a web-based application that is wholly or partially provided by a remote processor.

The one or more processors may be capable of providing control signals and/or performing operations in response to input signals from a user input device and/or initiated from a further processor and executing instructions stored in the one or more memories. One or more of the processors may be an application-specific and/or general-use integrated circuit(s). Further, the processors may be a dedicated processor for performing in accordance with the present system and/or may be general-purpose processors wherein only one of many functions operates for performing in accordance with the present system. The one or more processors may operate utilizing a program portion, multiple program segments, and/or may be a hardware device utilizing a dedicated or multi-purpose integrated circuit. Further, in a distributed system, portions of an operation may be performed on one device with data generated therefrom being transferred to one or more further devices. In one embodiment, the place service interface library 110, local place server 120 and application 140 may be provided by programming portions residing within a memory of a portable device. The operations associated with each of the place service interface library 110, local place server 120 and application 140 may be provided by one or more processors residing within the portable device that is operably coupled to the memory. As such, an Application Programming Interface (API) may be provided through suitable programming of the processors to enable interaction with the present system from both of a user's vantage point and a service providers without requiring an adjustment to each others unique operating requirements.

Figure 2:
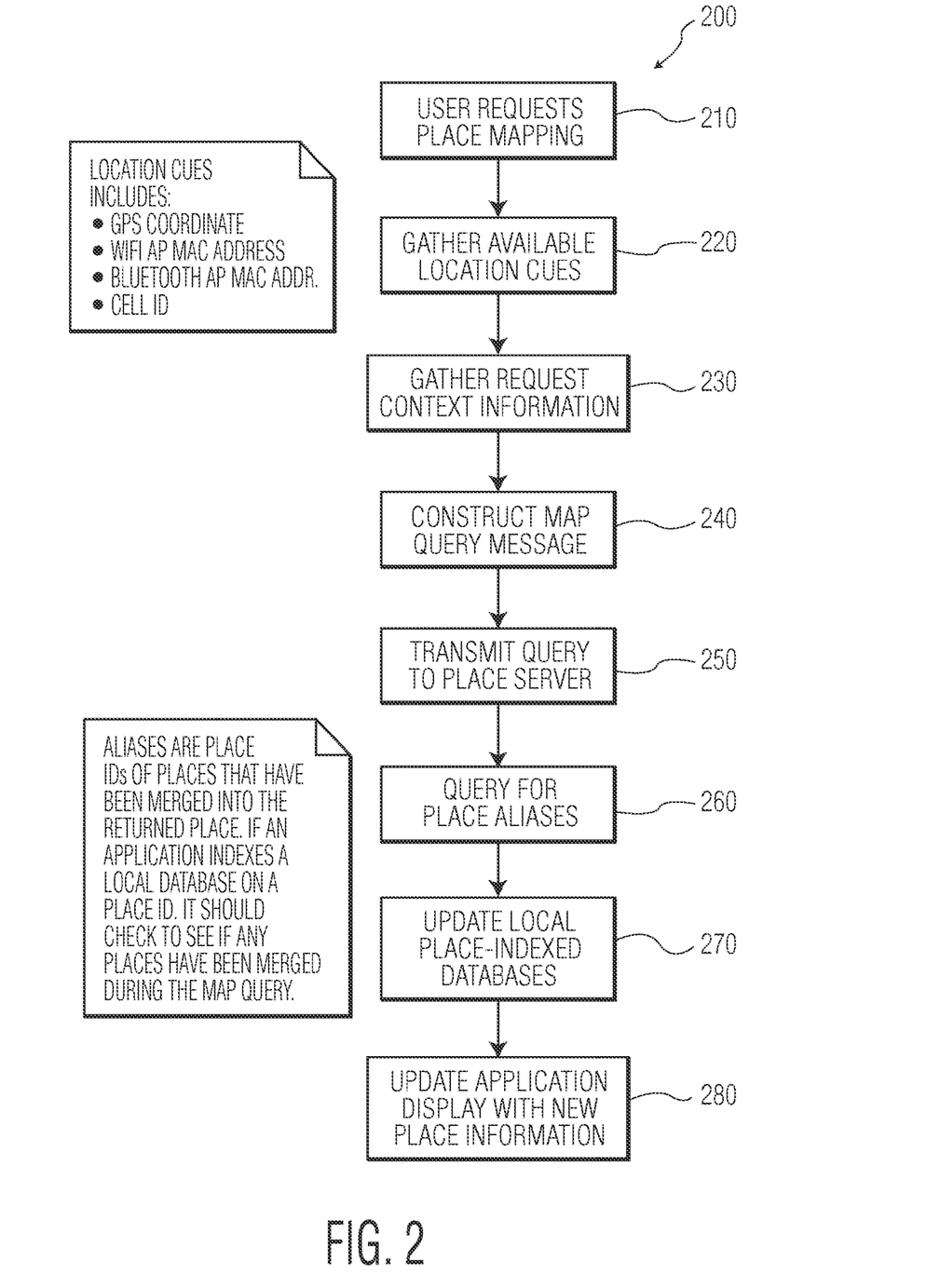
FIG. 2 shows a flow diagram related to a client side interaction in accordance with an embodiment of the present system.

Operation of an embodiment in accordance with the present system will be further described additionally referring to FIG. 2 which shows a flow diagram 200 related to a client side interaction. In operation, the place service interface library 110, in response to an implicit or explicit request for location information during act 210, gathers location cues during act 220 from one or more of the GPS sensors 150, location services 160, mobile operator 170 (e.g., cell tower ID), wireless AP 180 and any other source of location cues. The place service interface library 110 further gathers a context of the location request during act 230. The context of the location requests may be utilized to determine a desired resolution returned from the location request. For example, a mapping program making a location request should be returned a place at a higher resolution than a request for a nearby airport. The context may be implied from the application making the location request or may be explicitly provided by the user.

The location cues and context are utilized by the place service interface library 110 to construct a location query message during act 240. The location query message is transmitted to the local place server 120 and/or remote place server 130 during act 250. The place server, during act 260, determines if the current location request (based on the location query message) corresponds to a previously discovered place or is near to a previously discovered place, such that the two should be merged into a single place having one place ID. For example, the local place server 120, in examining a local place-indexed database, may determine whether the current location cues correspond to (e.g., are the same or similar to) location information for a previously discovered place that is available locally (e.g., local to the mobile device), such as within the cache or the local place server 120. In a case wherein corresponding location information of a previously discovered place is retrieved, the local place-indexed database is updated during act 270 to associate the current cues, if different than the previously stored cues, with the previously discovered place.

During act 280, the location information is provided, such as to the application 140. The location information, as may be simply termed the place, provides a relationship between discovered data surrounding a location and a unique identifier for that location. The location information may include a unique place identifier (ID), an identification of the corresponding geographic location and/or area, ownership information identifying the user, and/or a human readable name for the place.

With this basic information, places may be managed by mobile devices (clients) in a unified manner. A client wishing to add more information (e.g., a note) to a place may simply create a separate database through operation within a provided UI, and index the note database utilizing the place ID. In one embodiment, the notes may be simply stored in a filename that is the same as the place ID. For example, a user may desire to associate a simple textual note related to a place (e.g., my desk). In later relating to the place, such as a future request for the place, the present system (e.g., cache, local place server 120, remote place server 130, etc.) in response to the client's queries may return the location information and any associated notes.

One of the elements of the present system is an ability to generate globally-unique IDs for discovered places. In one embodiment of the present system, when a device (e.g., a cell phone) attempts to discover a place, cues received by the cell phone are utilized to query the local place server 120 and/or remote place server 130 to see if the place has been found already. In a case wherein the place has been previously found, that place ID is returned by the place server. In a case wherein the place has not been previously found, the place server may generate a new place to associate with the cues and return the new place to the client. In one embodiment in accordance with the present system, the place IDs may be generated in a way that lets numerous sporadically-connected devices all generate IDs without a need for centralized collision detection. What is meant by this is that a new (unique) ID is generated every time a new place is discovered. In one embodiment of the present system, characteristics of the mobile device, a time of the location request and/or time of discovering the new place may be utilized in creating the place. The algorithm for generating place IDs may combine some or all of the unique information that is known about the mobile device that is generating the place IDs at the time of creation. For example, username, time & date, device unique IDs and/or other unique information, or combinations thereof, may be utilized in generating the unique ID.

When location information is not retrieved, the UI of the place service library 110 may provide a request for the user to provide the human readable name to associate with the location cues. The request may be provided as a form that the user may respond to with the user providing, amongst other things, the human readable name. As such, the location information may be utilized to build a common ontology of place names and corresponding geographic descriptions as described further herein. The location information together with the common ontology may be utilized to enable operation of the LBS.

The cues associated with globally-unique IDs may be utilized as "beacons" that the mobile devices may utilize to identify and/or recognize a location. For example, a beacon that has been received by a mobile device previously (presuming that the source of the beacon has not moved since the previous receipt) indicates that the mobile device is in the same (or similar) place as the previous time. In this way, beacons become indicative of location. In accordance with the present system, by keeping track of the various beacons that may be received at a given location, the mobile device may develop a persistent notion of place that may be utilized to support LBS.

Some other beacons may include Bluetooth network access points, WiFi access points, RFID tags, or any wireless device with a unique ID that does not physically move much, such as emanating from the wireless access point 180. By utilizing the beacons, a typical mobile device in a given area, such as a typical urban area, may identify two or more beacons that are accessible at a location. Further, the mobile device need not connect to the wireless access points to make use of the beacons to develop an identification of the location of the mobile device. Through use of the beacon(s) from the wireless access point(s) 180, the mobile device may identify a place relative to known beacons. By combining one or more cues together with a unique device ID, such as a username and a nearby beacon, it can be inferred that the device and by extension the user of the device is near the beacon.

The cues from any one or more of the GPS sensor 150, location services 160, mobile operator 170 and wireless access point 180 may include time information relating to a time of receiving the cues. The temporal information may be associated with any received location information. In another embodiment, temporal information may be received by a separate time device or may be forwarded by a place server at a time of providing location information. By associating temporal information with the location information, a user may recall location information related to a given time. For example, an LBS may be provided wherein a user is able to request the LBS based on location information from a given time. For example, a user that was at a given location at noon (e.g., lunch time), may request information related to eating establishments in that same area even when the user is now at a different location by merely recalling the time when previously in that area, and then requesting the LBS based on that temporally associated location information. By sharing the location information with associated temporal information with other devices of the user or another user, the other devices or user may also benefit similarly when located elsewhere. In addition, the place server may associate cues to a single location based on two or more devices of a user receiving and forwarding the cues within a given period of time. For example, a user associated with a PDA may receive and forward WiFi and GPS cues at one time while a cell phone of the user may forward a tower ID a short time thereafter. The place server in accordance with the present system may associate the cues (WiFi, GPS and tower ID) together based on having received the cues from the same user, albeit from different devices of the user, within a given time period.

Associating temporal data with the location information (e.g., a C-square description associated with temporal data) may solve one or more of several previous problems. In case of a moving object associated with a fixed location cue(s), such as a fixed beacon, associating the fixed location cue(s) with temporal data removes any ambiguity as to what location information is desired (e.g., U.S.S. JFK on Dec. 1, 1994 at noon, a previous point in time). Further, in some cases a named area may have boundary conditions that vary with time or a place ID may change over time for a given (or varied) boundary. For example, a place ID having a boundary that was Czechoslovakia in January 1995 may now be associated with one or another of the Slovak Republic or the Czech Republic. Associating the location information with temporal data facilitates an association with a current place ID and facilitates a location request that may be based on a place ID that is no longer valid (e.g., a request for the name of hotels in Czechoslovakia). Boundary areas may have also grown through acquisition (e.g., airport expansion), subdivision, and/or geological influences (e.g., coastal erosion).

Place IDs that are not universal may also change similarly (e.g., the user sells a portion of their land so the boundaries of the user's home changes). The location information may also change completely for a same place ID (e.g., "my home" may change completely when "I" move) yet I may be interested in restaurants that are located around my old home. In this case, the present system may further associate the old place ID with a further place ID automatically. For example, when a user requests current location information with a user readable place name that corresponds to a previous user readable place name but that does not have any geographically overlapping location information as the previous user readable place name, the previous user readable place name may be amended automatically to differentiate between each of the user readable place names. For example, after I move, my previous user readable place name "home" may change to a name that is different, such as "my old home" which in turn may be associated with "my home" on Jan. 1, 1995 (temporal data).

In accordance with the present system, use of GPS coordinates from the GPS sensors 150 or hand-entered components of an address may be utilized to tie relative locations (e.g., discerned from one or more beacons) to absolute locations. For instance, a laptop with WiFi can discover WiFi beacons and determine a relative location, but to determine an absolute position, typically requires input from another device or a database (or algorithm) mapping relative positions to geographic positions. In accordance with the present system, a mobile device (e.g., PDA) having any combination of a relative position with an absolute position for a given location or area may share this information with other devices to provide those devices with a common identification for the location or area. For example, a user may carry a PDA having WiFi and a GPS and a laptop having WiFi access. In this scenario, the PDA may share the common identification with the laptop to enable LBS for the laptop. Further, the common identification may be shared with other user devices, either of the given user in possession of the PDA and the laptop, or with devices of other users in a similar location or area to provide LBS for those devices based on inferences about the similar location or area without those devices having a dedicated source for the absolute position.

The local place server 120, the remote place server 130 and/or the cache of the place service interface library 110 may, in accordance with the present system, handle correlation and co-location inferences (e.g., receipt of the common location and/or transfers of the common location from one device to another). The remote place server 130 may operate as a central storage for location information (e.g., places) such that the location information may be shared, if desired, between devices, applications, and users. In accordance with an embodiment, a choice whether to share location information may be available wherein the user may select to not share location information or may elect to only share location information with other devices of the user. In other words, the user may choose to not share location information with other users. The operation of receiving and sharing location information may be decentralized, such as through one or more of each of the local place server 120 and the remote place server 130, yet devices may still connect to a central place server (e.g., a given remote place server 130).

In accordance with an embodiment of the present system, each "client" (e.g., cell phone, laptop, etc.) device may run a local place server, which may synchronize with a remote (central) place server. This allows the clients to determine location information while offline, such as a current place, based on previously discovered location information. In this embodiment, when the mobile device connects to the remote place server (e.g., again), the device may then share any discovered location information with the remote place server so that the location information discovered by the client (device) may be utilized by other devices as well as enabling a reconciliation (e.g., search for aliases) based on location information present at the remote place server.

Figure 3:
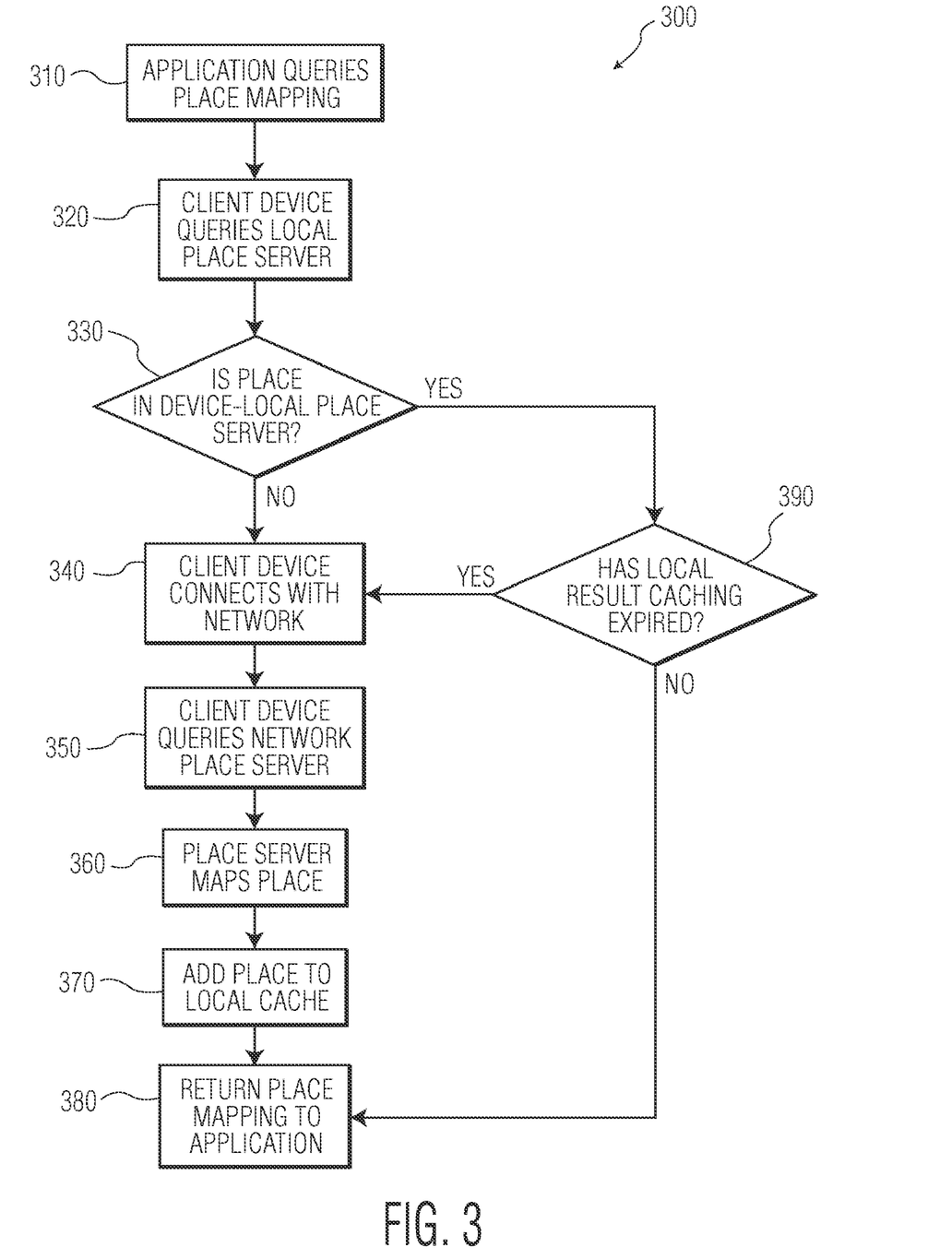
FIG. 3 shows a flow diagram of an illustrative interaction between a local place server and a remote place server in accordance with an embodiment of the present system.

In a case wherein the cues do not correspond to locally available location information, the local place server 120 may communicate to one or more remote place servers 130 to retrieve corresponding location information. FIG. 3 shows a flow diagram 300 of an illustrative interaction between a local place server and a remote place server in accordance with an embodiment of the present system. During act 310, an application utilizing location information collects location cues and context (e.g., see, FIG. 2, acts 210, 220, 230, 240) and makes a location query to a device's local place server. The local place server determines during act 330 if a place corresponding to the cues is present in a database of the local place server. If no corresponding place is present at the local place server, the client device connects with a network during act 340 and a query of a remote place server is made during act 350. The remote place server similarly determines if a previously named place exists in the remote database during act 360. Further remote place servers present on other remote devices may also be queried during this time. The remote place server maps the location query which, if a corresponding previously discovered place is found corresponding to the location query, the previously discovered place is returned in response to the query. In a case wherein no previously discovered place is found that corresponds to the query, a new place ID is generated and returned in response to the query. The returned place is received by the local place server and is added to the querying devices local cache during act 370 and the returned place is provided to the application during act 380. In a case wherein a previously discovered place is identified during act 330, the local place server determines whether the previously discovered place is present in the local cache during act 390. When the previously discovered place is present in the local cache, the previously discovered place is provided to the application during act 380. If the previously discovered place is no longer present in the local cache, the present system in accordance with an embodiment connects to the remote place server during act 340 and acts continue similarly as when no local previously discovered place is found (e.g., acts 350, 360, 370, 380).

Figure 4:
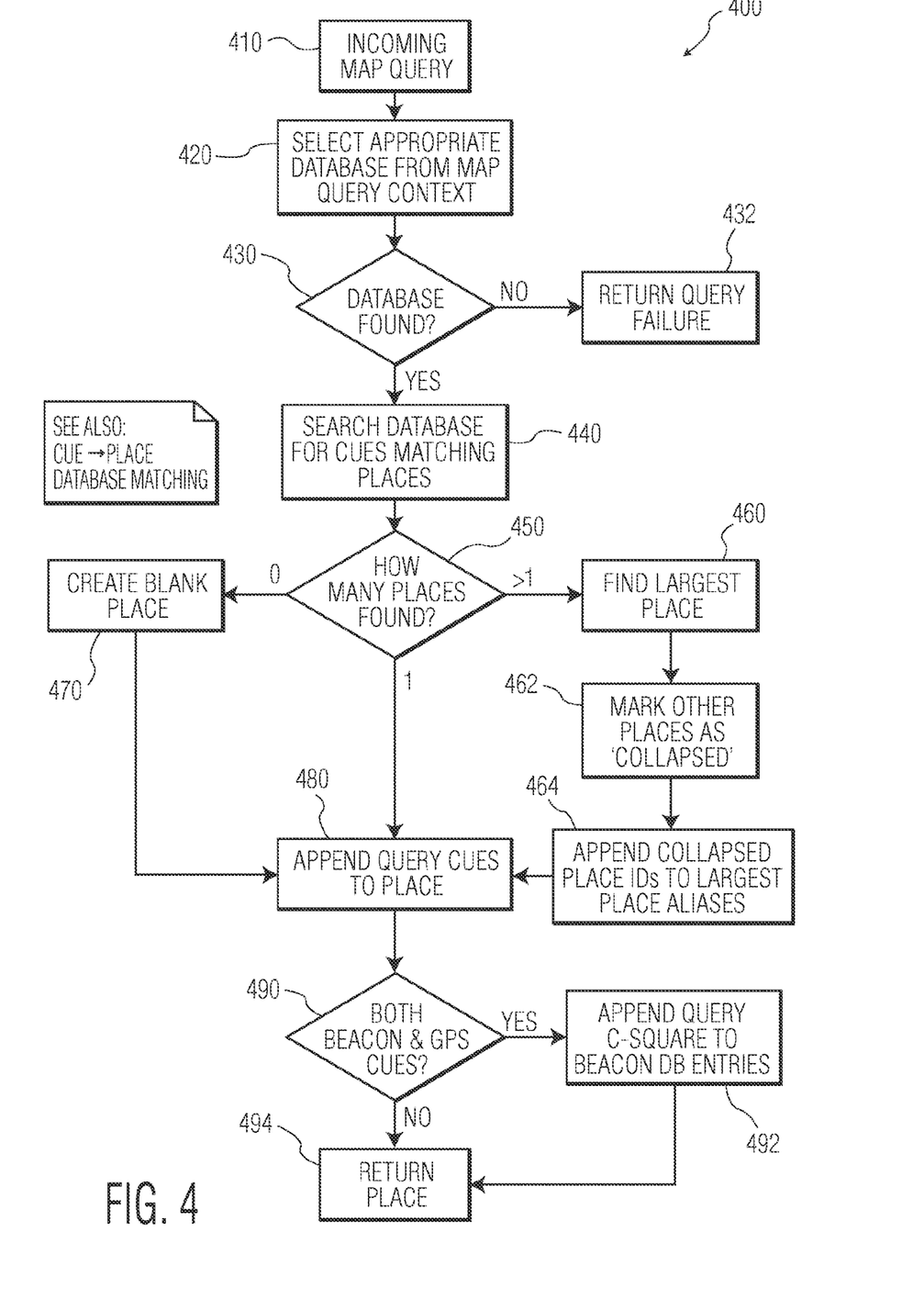
FIG. 4 shows a flow diagram of an illustrative response of remote place server to a location query in accordance with an embodiment of the present system.

FIG. 4 shows a flow diagram 400 of an illustrative response of remote place server to a location query in accordance with an embodiment of the present system. During act 410, the remote place server receives a map query (e.g., a location request) from a device and/or application. The remote place server during act 420 examines the cue(s) provided in the query including a context of the query to determine an appropriate database to utilize in responding to the query. The context assists in selecting a suitable resolution for responding to the query. In a case wherein a suitable database is not identified during act 430, a query failure may be returned during act 440 indicating that the query was not matched with a parseable location format (e.g., query request could not be deciphered) or a corresponding location database could not be found. In a case wherein the corresponding location database could not be found, in place of returning a query failure, an inquiry may be returned to the device that initiated the request for location information. The inquiry may include a request for clarifying information to clarify the request for location information. For example, in response to the inquiry, additional cues may be entered by the user or may be returned by the device. For example, the device may have acquired additional cues since the first request for location information. The additional cues may assist in resolving the database. In a case wherein the location is still not resolvable, in some cases after one or more additional inquiries, the location cues collected may be added to the place server database to assist build the database with location cues associated a unique place ID even if a current association with the place ID may be made. Naturally in a case wherein one or more inquires is made, the user may explicitly request termination of further inquiries.

In a case wherein a suitable database is identified during act 430, the suitable database is searched for location information that corresponds to the query (aliases) during act 440. Corresponding location information is determined by trying to match received cue(s) to location information present in the remote place server's database.

Figure 5:
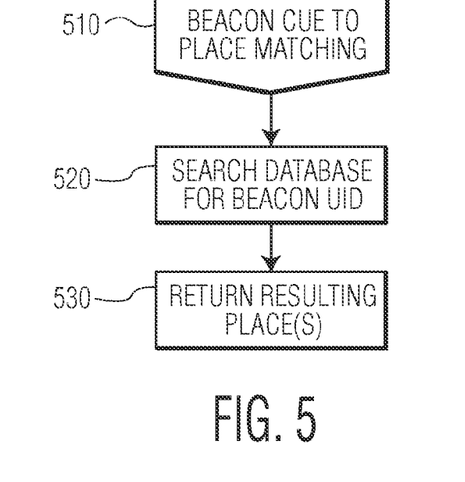
FIG. 5 shows a flow diagram of an illustrative cue matching search in accordance with an embodiment of the present system wherein the query cue includes a beacon cue.

FIG. 5 shows a flow diagram 500 of an illustrative cue matching search (act 440) in accordance with an embodiment of the present system wherein the query cue includes a beacon cue (act 510). Since each beacon cue is accompanied by a unique ID of the beacon cue as a portion of the query, the database is searched for IDs that correspond to the unique ID. During act 530, previously discovered place(s) that correspond to the unique ID are returned.

Figure 6:
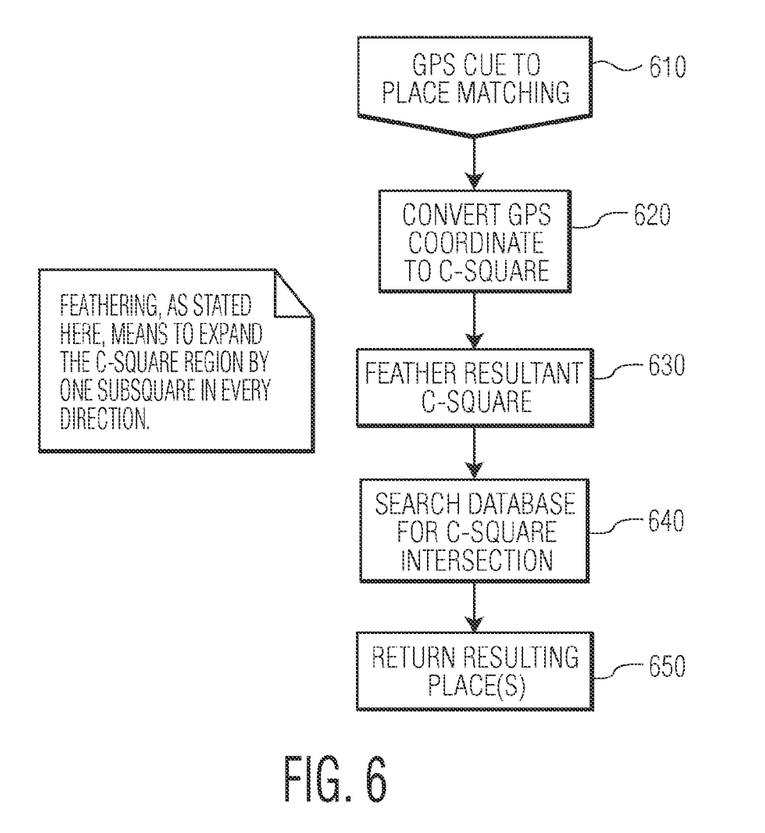
FIG. 6 shows a flow diagram of an illustrative cue matching search in accordance with an embodiment of the present system wherein the query cue includes a GPS cue.

FIG. 6 shows a flow diagram 600 of an illustrative cue matching search (act 440) in accordance with an embodiment of the present system wherein the query cue includes a GPS cue (act 610). The GPS cue (latitude and longitude coordinate pair) may be converted (e.g., by the local place server 120 and/or the remote place server 130) during act 620 to a spatial indexing system that simplifies determination of bounding and/or overlapping areas.

When representing location by way of a computer, prior systems tend to gravitate toward latitude and longitude coordinate pairs. As most location data of that precision is gathered from a GPS, such as the GPS sensors 150, a simple latitude and longitude coordinate pair is the easiest way to represent a location. In effect, the latitude and longitude coordinate pair represents a single point on the Earth. However, in determining if a found place is new or previously discovered, the present system represents places as areas. For example, if a user is in a coffee shop, the user would like that any area within the coffee shop returns the same place (e.g., the same location information). One way to make this determination without having to measure more points is to simply extend a radius around the point represented by the latitude and longitude coordinate pair.

The area covered by the circle centered at the known point is roughly the area that is used to represent the place. Unfortunately, not all areas can be well represented by simple circles. For example, for a large building which takes up a whole city block, the center of the circle may be positioned in the center of the building, yet the radius may extend beyond the side streets (to have the circle encompass the corners of the building). Of course, in this case, a circle is not a very good representation of the building. For example, trying to model an L-shaped building with circles, you would either need to add many more circles, which complicates any calculations required to determine if a new point is within the circles, or you oversimplify and include areas which aren't actually a part of the building. By adding more measured points, different modeling techniques may be utilized. With two points, rectangles aligned along the lines of longitude may be utilized. One point is utilized to designate the north-west corner and the other point is utilized to designate the south-east corner. By adding another point, a triangle may be used. Yet another point provides a quadrilateral. Each additional point enables use of more precise polygons to represent an area, however, also increasing the complexity of the calculation. While polygons are a good way to represent area, they have drawbacks. The main reason against using polygons for representing area is that comparing two complex polygons is a computationally expensive task.

A common task that location-based systems have is testing to see if one shape is contained within another, for example to determine if a new location is the same as a previously discovered place. With polygons of varying scale and complexity, the calculations may be unwieldy. With polygons, there are complex tricks that may be utilized to do the necessary "collision detection", however, these calculations are very processor intensive and do not lend themselves to being performed with limited resources, such as may exist resident to the mobile device.

An article by Tony Rees entitled "C-Squares, a New Spatial Indexing System and it Applicability to the Description of Oceanographic Datasets", published in Oceanography, Vol. 16, No. 1/2003, describes a technology developed by the CSIRO Marine and Atmospheric Research in Australia that may be utilized to represent large-scale geographic data sets. C-Squares (Concise Spatial Query and Representation System) facilitate certain types of geographic queries, most notably area comparisons and inclusion tests. An additional benefit of C-Squares is that other tests or techniques may be performed readily. For example, proximity tests, feathering (expanding the area by a small amount), and Boolean operations (union, difference, etc.) may be readily applied to C-Square representations of an area.

C-squares is built on a principle that the surface of the Earth may be divided up into a grid of numbered squares (individually termed "c-squares"), which are each further divided into smaller squares that are also numbered. Each square may be further divided until a desired resolution is achieved. Particularly, C-Squares start off by subdividing the Earth into four quadrants, assigning each C-Square a number. Each subdivision is then further subdivided into four more squares (2×2) and numbered. Those squares are then divided into 25 more squares (5×5) which are numbered. Each of those squares is then divided into a 2×2 grid, making four more squares. The subdivision continues this way down to a desired resolution (scale). The subdivided squares are then represented by a simple ASCII string of numbers with the largest (parent) square represented first and each successively smaller square represented thereafter.

For example, to represent an individual square (which represents an area on the Earth), one simply combines the numbers into a single C-Square string. Some such examples of these strings are:
7307:487:380
7307:487:380:143.

Each three-digit part of the C-Square string represents one of the sub-squares. Adding more C-Square strings increases precision, while retaining information about the parent area. In this way, one can easily tell that 7307:487:380:143 is located within 7307:487, simply by comparing the C-Square strings. C-Squares strings can further be extended by joining multiple C-Square strings with a "|" symbol, forming multiple portions (e.g., c-Square strings that may be of varying levels of precision) of the C-Square. With joined together C-Square strings, multiple squares can define an area more precisely than a less granular (but larger area) C-Square.

In accordance with an embodiment of the present system, a discovered place may have the latitude and longitude coordinate pair converted (by an algorithm) to a C-Square at a desired, determined, or predetermined level of resolution (converted to an area containing, or touching on, the latitude and longitude coordinate pair) which then may be compared to known places that are also represented by C-Squares. Since the collision determination (e.g., bounding box, intersection, etc.) may now be performed utilizing a simple comparison of ASCII text strings, even a thin client may readily make this determination without overly loading the system. In a case wherein a new place corresponds to a previously discovered place, a query based on the new place will return the previously discovered place, such as the previously discovered place ID, etc.

During act 620, the GPS cue (latitude and longitude coordinate pair) may be converted to a bounding area designation, such as a C-Square. The resultant C-Square may be feathered during act 630 by expanding the resultant C-Square by one sub-square in one or more of each direction. A sub-square typically is a smaller region than the resultant C-Square. The database is searched during act 640 to determine if the resultant C-Square plus feathering intersects a C-Square of a previously discovered place and a result is returned during act 650.

Figure 7:
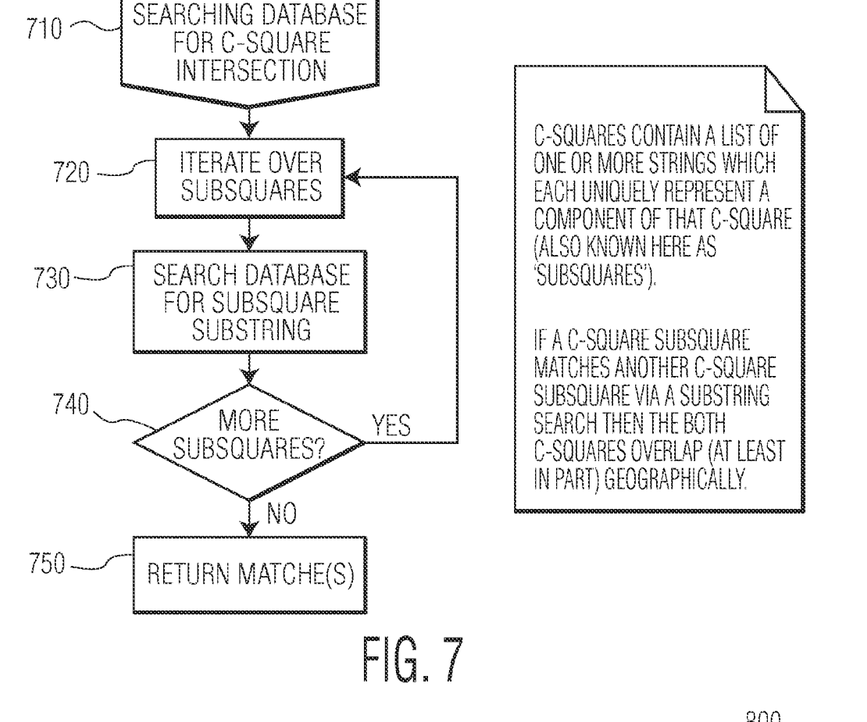
FIG. 7 shows a flow diagram of an illustrative database search for a C-Square intersection with the resultant C-Square and feathering (act 640) in accordance with an embodiment of the present system.

FIG. 7 shows a flow diagram 700 of an illustrative database search for a C-Square intersection with the resultant C-Square and feathering (act 640) in accordance with an embodiment of the present system (act 710). Since a C-Square, whether it be from the query or previously discovered places, may contain multiple C-Square strings or sub-squares, each portion of the query is parsed during act 720 and the database is searched during act 730 to determine if the database contains corresponding portions of previously discovered places. In a case wherein a query C-Square portion matches a previously discovered C-Square portion as for example determined by a substring search, then the query C-Square and previously discovered place C-Square overlap geographically, at least in part. In a case where more query portions have not been compared to the C-Square database, further comparisons of the query portions are provided by act 740. When no further query portions are present or all have been searched, any matches are returned during act 750.

Returning to FIG. 4, a number of corresponding places returned in response to the context and cues is determined during act 450. In a case wherein no corresponding places are discovered, a blank place is created during act 470 and the query cues are associated with the blank place during act 480. In a case wherein beacon and GPS cues (latitude and longitude coordinate pair) are present in the query (determined during act 490), a C-Square string corresponding to GPS coordinates is determined and associated with the beacon cues (e.g., stored together as beacon database entries). The discovered or blank place is returned to the device and/or application during act 494 either as a result of both beacon and GPS cues being present in the query or not.

During act 450, in a case wherein one previously discovered place is returned in response to the query, the query cues are appended to the previously discovered place during act 480 and the process continues as described above. In a case wherein more than one previously discovered place corresponds to the query cues including the context, a largest (area) discovered place (e.g., as determined by a bounding box algorithm such as utilizing C-Squares) is found during act 460 and other discovered places are collapsed during act 462. The collapsed discovered places are appended to the larger discovered place during act 464 and the query cues are appended to the larger discovered place during act 480 and the process continues as described above.

Figure 8:
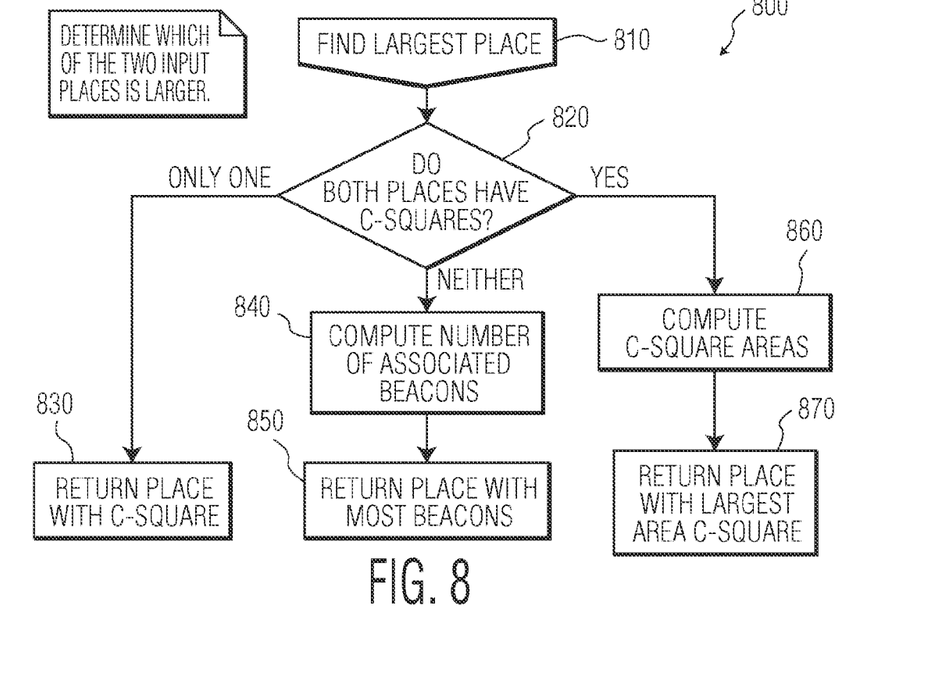
FIG. 8 shows a flow diagram of an illustrative process for finding a largest place in accordance with an embodiment of the present system.

FIG. 8 shows a flow diagram 800 of an illustrative process for finding a largest place (from the query or previously discovered places, see, act 460) in accordance with an embodiment of the present system (act 810). During act 820, it is determined whether the places have corresponding C-Squares. In a case wherein neither of the places has an associated C-Square (e.g., each only has associated beacon cues), the number of associated beacons is computed during act 840 for each place and the place with the greatest number of beacons is returned in response to the location query during act 850. In another embodiment, the place with beacons that enclose a larger area may be returned. In a case wherein only one of the places has an associated C-Square, that place is returned in response to the location query during act 830. Lastly, in a case wherein both of the places have an associated C-Square, the area of each place is calculated during act 860 and the place with the largest area is returned in response to the location query during act 870.

The collapsing of the smaller discovered places is one way, in accordance with the present system, wherein a common ontology may be provided. For example, by collapsing the smaller discovered places including the corresponding place names into the larger discovered place, a single place name is provided (as opposed to the previous plurality of place names) as a result of the query cues and context. In this way, boundaries of discovered places may be adjusted to include the smaller discovered places as described in more detail below. In accordance with an embodiment, users are still enabled to utilize different human readable names although the place IDs may be common.

In accordance with an embodiment, the client may not run a local place server, for example, due to a lack of resources, as a matter of design choice, or for any other reason or combinations of reasons. For example, a thin client as understood by a person of ordinary skill in the art, may be arranged to have the remote place server 130 perform associations and comparisons to prior location information in accordance with this embodiment. In this way, the clients may simply talk with the remote place server. These clients may get many of the benefits of the place server system (without the local place server) at the expense of more network overhead and a dependency on having a network connection for place discovery. To compensate for this, a smart thin client may cache places in memory (without using a local place server) and simply check for updates instead of having to download results each time a location query is made. In one embodiment, the place server communicates via a standardized formatted communication language, such as Hypertext Transfer Protocol (HTTP) using XML and HTML. In this way, any platform that uses these standard communication technologies, may readily incorporate the location-finding capabilities of the present system without worrying about implementing new communication protocols. The present system may be implemented in a platform independent programming language, such as Java. Additionally, the present system, such as the remote place server 130 may be implemented to be compatible with AJAX-based websites. This compatibility enables interoperation with an ever-expanding world of intelligent websites that may enhance the operation of the present system.

The context provided with a location request enables a determination of the resolution that is appropriate in response to the location request. In one embodiment in accordance with the present system, the resolution may be determined based on the LBS that is being utilized (e.g., based on application 140). In accordance with the present system, the place server 120, 130 responds to a requested resolution, such as building, street, neighborhood, city, etc. For example, for a LBS related to a local airport, the place server may return a city (named) place while a request regarding local restaurants may return a neighborhood place. A further constraint on returning a given resolution place may be the cue provided by the wireless device in requesting the location identification. For example, if a cue is based on a cell node ID, a larger geographic area may be returned as the place as opposed to if the cue is provided by a WiFi node. In accordance with an embodiment of the present system, identifiers may be chosen to correspond to a resolution available from the cues provided. In some cases, a desired resolution for a place may be determined by the user. For example, a user may be provided with an interactive map upon request on which the user may define the boundaries manually within the map by setting outside boundaries or drawing the boundaries manually. Other systems of manually or semi-automatically (e.g., automatic with user solicited interaction) setting boundaries would readily occur to a person of ordinary skill in the art and are within the scope of the present system.

In accordance with the present system, while two or more discovered places may at first identify different places and thereby have different place IDs, the more times that a location request is made in a vicinity of these different (distinct) places, the more likely that these distinct places will be joined by the present system into a combined place ID. The inventors recognized that typically users visit a limited number of places regularly. For example, for a user that commutes to and from work, the user may daily start at home, stop at a given place on the way to work for coffee, arrive at work, go out to lunch in an area near work, return to work, then, at the end of the day, return home. Accordingly, location requests may be made at each of the locations daily. The user is better served if each of these locations is recognized as a single distinct location as opposed to numerous locations separated by small differences in position. In accordance with the present system, while initially each location may be made up of different discovered places, as more places are discovered within an area, these different discovered places will be joined together to form a single place.

In accordance with this embodiment, each time a new place is discovered, an ASCII string will be returned representing, for example, one or more C-Squares at a given resolution bounding that place plus an additional area feathering (e.g., adding to, see act 630) the bounding area. When a subsequent location request is made, if the subsequent place is determined to be in contact with the bounding plus feathered area of the previous place, the place ID for the previous discovered place may be returned in response to the subsequent location request or at least a common place ID is returned in response to the current and further location requests. The more location requests made from this general area, for example in a case wherein a location request is made every time a cell phone call is placed, the more likely that the distinct locations will be joined into one place having a single (unique) place ID. The location requests may be viewed like drops of water placed on a surface. The more drops of water placed in an area, the more likely that the drops will join together to form a large drop (e.g., a single place having one place ID). In accordance with an embodiment, in a case wherein the place server (local or remote) determines that previously different places need to be joined, the place server may, through the UI, prompt the user to provide a name for the joined places. As may be readily appreciated, each of these location requests may in fact be made by different devices. For example, in one case the user may utilize a cell phone to make a phone call at the coffee shop. At another time, the user may utilize a laptop computer to connect to a WiFi network at the coffee shop. These different devices, namely the cell phone and laptop may initially have different place IDs for identifying the coffee shop. However, by the different devices sharing the place IDs through the place server, the place server may return a common place ID to the different devices including information gleamed from the different cues that may be received from the different devices.

In accordance with an embodiment of the present system, the place server may be provided with data identifying well known locations, such as landmarks, city boundaries, states, countries, etc. An identification of cues and/or corresponding C-Square may be determined for these well know locations by a third party central authority that provides these to assist operation of the present system. In this way, a location request identified to be made from a place bounded by the well known location will return the place ID for the well known place as opposed to a new place ID.

In accordance with a further embodiment, users (or software acting on behalf of users) may share places with different devices of the user and/or with other users. In one embodiment, each place in the system may be designated as either a personal place or a global place. In this embodiment, a user is not allowed to edit another user's place unless it's designated as a global place. Global places may be modified by any user, so global places may be designated for places like parks, city landmarks, etc. wherein multiple user's contributing to map the place may be more useful than depending on a single users location requests, which may be much more narrowly defined. For example, a given user may always go to a particular fountain within the park. However, it is likely that in a case wherein the park is defined as a global place, multiple users would better map the boundaries (if this is the desired resolution) of the park than the single user that always returns to the same fountain. As may be readily appreciated, in a case where the resolution is suitably selected at the resolution of the fountain within the park, then the mapping would combine cues and place IDs in the vicinity of the fountain.

In a further embodiment, a user may determine to explicitly share a place with one or more other users (e.g., not simply making the place global). That way, the place (e.g., cues, place ID, etc.) could be modified by a group of people who may be interested in that place, such as a home of a family, or worker within their office building.

In these ways, boundaries of a place may be learned so that responses to location requests will match the user's expectation that minor changes in location will not affect the place returned in response to the location requests.

The present location information system may be suitably coupled to any application, such as a LBS, to provide a location based customization. An example of such an application is an application and corresponding user interface providing a contact list that utilizes place as determined in accordance with the present system. In accordance with an embodiment, location information may be provided to the contact list. For example, many cell phones have a distinct address book and call log. The address book is usually organized by name or group and the call log is organized by time and frequency of calls. Typically, calls may be placed from both lists. The call log functions as a contact list of people relevant to you in the context of time, such as people you spoken to recently. In one embodiment in accordance with the present system, a call log is provided based on location as well.

Figure 9:
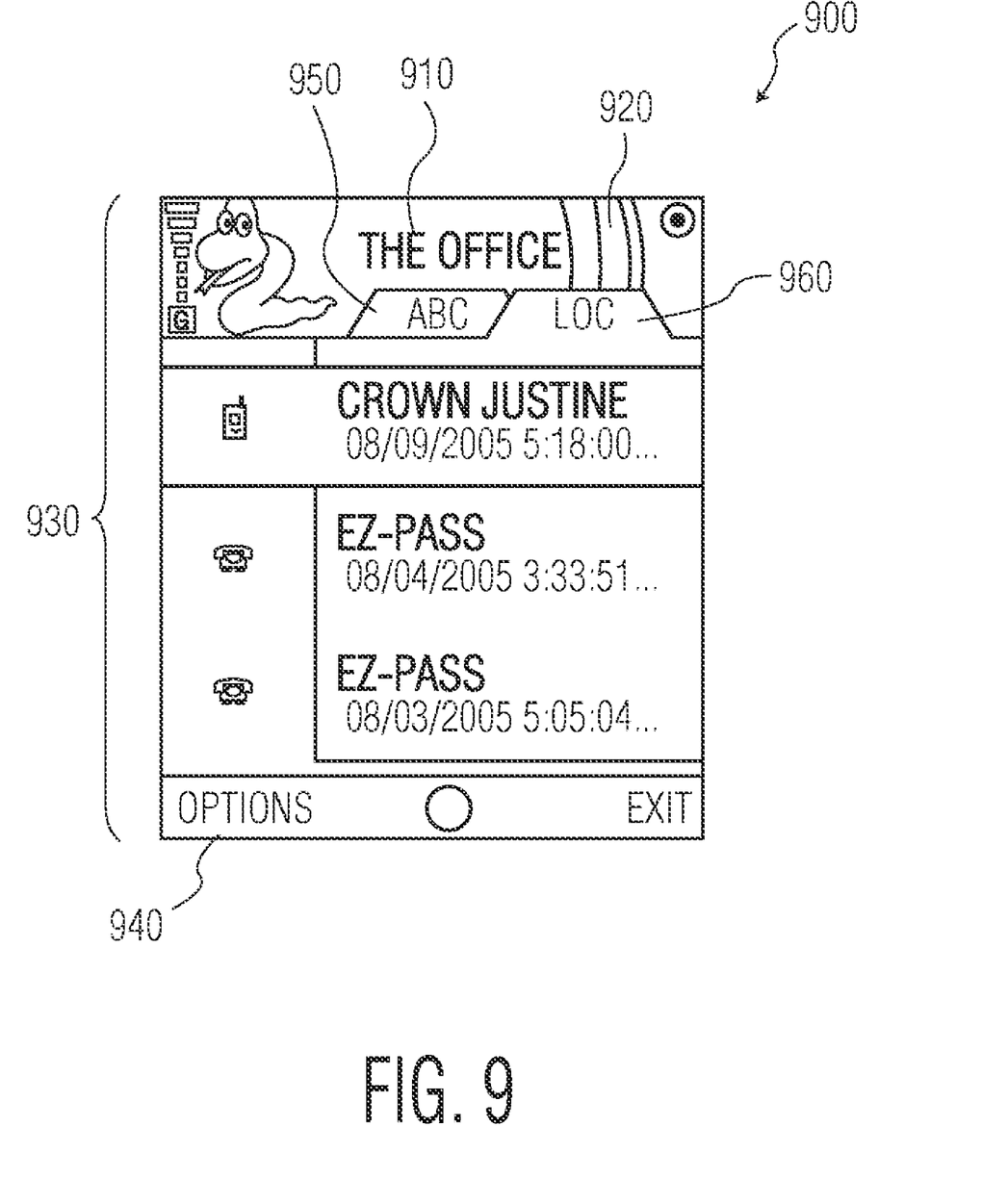
FIG. 9 shows a user interface (UI) that may be provided by a location aware application in a form of a call log in accordance with an embodiment of the present system.

FIG. 9 shows a user interface (UI) 900 that may be provided by a location aware application in a form of a call log 930 in accordance with an embodiment of the present system. FIG. 9 shows the calls that were made at a current location (named "the office" (see, item 910) in a title bar 920). A location tab 960 presents the call log 930 for this location, illustratively sorted by date. An options selection 940 may be utilized to set options of the call log 930 including the displayed sort method. A typical alphabetical contact list is available by selection of a tab 950 labeled "abc" positioned left of the tab 960 within the UI 900. For example, place contacts may obtain location cues from a Bluetooth GPS connected to the cell phone, as well as a Cell ID. When used together, the cell phone updates the place server's knowledge of the radio range of cell towers, making the location system more accurate without any extra effort by utilizing received signal strength of cell tower beacon(s) to determine a distance from one or more cell towers that are "visible" to the cell phone. By providing a call log 930 that includes location context, telephone numbers that have been previously dialed at a given location, will be available when that same location is subsequently visited or requested (such as when the cell phone is elsewhere but "the office" location is desired. In this way for example, phone numbers dialed from the office will be present in "the office" call log while phone numbers previously dialed from home, may be present in a "home" call log. The options selection 940 may be utilized to select a location when the cell phone is not currently in the location corresponding to a desired call log. Typically, the call log corresponding to a current location of the cell phone would be depicted in the UI 900 by default although, other options may be available. This application may be readily programmed to run within an open or proprietary operating system. For example, an embodiment of the present system may be arranged to run on a Symbian operating system, such as a Series 60 phone.

In accordance with another embodiment of the present system, a location aware web browser may be provided. For example, a browser provided on a cell phone running, for example, a Windows™ mobile platform may have access to location cues, such as GPS latitude and longitude coordinate pair data. In one embodiment, the location cues may be provided through a Bluetooth GPS connected to the cell phone. The location information discerned in accordance with the present system may be utilized in concert with web pages that are arranged to utilize the location information in interacting with a web browser, such as MiniMo (e.g., an open source web browser arranged to run on small clients such as PDAs) present on or accessible by the cell phone. The web page may provide an synchronous Javascript program portion providing an XML (e.g., AJAX) based application. In accordance with an embodiment, a web page may utilize a discovered place provided by a place server to customize content provided to the client by the web page. In another embodiment, the web page may provide access to a place server. In this embodiment, the web page may acquire location cues from the cell phone (e.g., from the GPS).

The web page may then enable the user to request a current place, based on the provided location cues, from the Place Server. In a case wherein the query place is a previously discovered place (the place is known), a webpage or "place page" may be displayed to the user. If the place is unknown to the place server (or other extended place servers), the place server may present the user with a blank place page, via the web browser, that may be edited directly on the device, such as using in-browser WYSIWYG editing tools. In accordance with an embodiment, place pages may then be saved to the place server for later retrieval and/or sharing with other users. In accordance with a further embodiment of the present system, place pages may even be shared with users without the place server capabilities, for example, by way of a place ID-based URL identifying where the place page is stored. Further, as places change and get more defined, the places may change, such as the C-Square associated with the place and/or the place ID. In an embodiment, the user may edit place pages, such as their own place pages, at any point using the same tools used to create the place pages.

Numerous libraries may be utilized to interface with the Place Server in accordance with the present system. For example, a Perl client library may be provided to support the Place Server specification including interfacing with a GPS, Bluetooth, WiFi, and wired Ethernet capabilities of a client device, such as a client running the Linux operating system. A Python client library may be utilized to provide functionality in accordance with the present system on cell phone based clients, such as available from Nokia, to interface with other cell phone related libraries. A Javascript library may be utilized to support queries to the Place Server. In an embodiment utilizing Javascript, results from queries may be rendered using, for example, client-side XSLT. A Java client library may be provided to support queries and an object model available. A J2EE interface to the library may be provided to enable persistent caching of query results. The present system may operate in accordance with standards as set out by MLP. Through suitable programming, an API may be provided to enable interaction of the user with a service provider through the remote place server.

By adapting the present system to numerous devices and device types and sharing the information through the remote place server, the burden of having different interfaces and location nomenclature is removed from the LBS such that regardless of a source of location cues, a common back-end system through the remote place server is provided to the LBS. In prior system, the LBS needed to adapt to the device, nomenclature and UI of the user device. Previously, different naming nomenclature provided a significant barrier to adoption of LBS. In the present system, user's may maintain their unique nomenclature (my desk, my office, my neighborhood) while the underlying location information may be generalized to provide location information that supports an underlying LBS. For example, while the system learns and adopts boundaries and merges divergent place IDs into a single unique place ID based on an accumulation of location information as described above, a user's unique naming convention may be maintained and provided to the user while the underlying location information, for example through C-Squares, is provided in a unified form, by the remote place server, that supports the underlying LBS. In this way, a user that names a place my desk and another user that names a same place as Dave's desk, with each accessing a same LBS, will get a same or similar result even though the UI in each case, provides a different name to the user since the underlying location information is the same as provided by the remote place server. In this way, the present system provides a way to relate divergent location information sources to common location information that enables different data layers of the system (e.g., the device, local place server, remote place server, LBS, etc.) to share common identifiers to support the LBS.

As may be readily appreciated, the present system may satisfy a user's need to obtain real-time location information (e.g., for an LBS) to a suitable resolution, when the request for location information includes one or more (e.g., two or more) sources of data. The present system may be used to satisfy a desire/need for location information while still enabling a centralized control to preserve user privacy. Further, the present system may be used to satisfy a desire/need to share location information between services and/or to relate varying descriptions of user location.

Of course, it is to be appreciated that any one of the above embodiments or processes may be combined with one or more other embodiments and/or processes or be separated and/or performed amongst separate devices or device portions in accordance with the present system.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. Foe example, although the absolute location information, such as provided by a GPS, is illustratively converted to a C-Square, other systems for representing location information may be readily applied. For example, other bounding area designations may be readily applied. Further, absolute location information may be maintained, such as latitude and longitude coordinate pairs including feathering etc., in accordance with the present system although bounding box calculations are rendered more complex. In addition, while location information is illustratively described as pertaining to the terrestrial body referred to as Earth, clearly location information for other terrestrial bodies (e.g., Mars) may be suitably employed (with or without associated temporal information). The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. An Application Programming Interface (API) stored on a processor readable memory medium, the API comprising:
   a portion arranged to receive location cues from a device as a portion of a request for location information;
   a portion arranged to compare the location cues to a database of location cues;
   a portion arranged to return a location query page associated with a new place ID if the location cues do not correspond to the database location cues; and
   a portion arranged to return a previously discovered place ID associated with at least one database location cue and arranged to associate any of the location cues that do not correspond to the at least one database location cue with the previously discovered place ID if one or more of the location cues correspond to one or more of the database location cues.

2. The API of claim 1, comprising a portion arranged to expand the location cues and compare the expanded location cues to the database location cues, wherein the portion arranged to return the previously discovered place ID associated with the database location cues is arranged to return the previously discovered place ID if one or more of the expanded location cues correspond to one or more of the database location cues.

3. The API of claim 1, comprising a portion arranged to share the previously discovered place ID with a further device in response to a location request from the further device that includes one or more location cues that correspond to one or more of the database location cues that correspond to the previously discovered place ID.

4. The API of claim 1, wherein the device is a device of a user and wherein the database location cues include temporal cues related to a time of acquiring the database location cues and user identification information identifying the user associated with the database location cues, the API comprising a portion arranged to share the place ID with a further device of the user in response to a location request from the further device that includes temporal cues that are within a predetermined time of one or more of the database temporal cues.

5. The API of claim 1, wherein the location cues include a context, wherein the portion arranged to return the previously discovered place ID is arranged to return the place ID at a location resolution determined from the context.

6. The API of claim 1, wherein the location cues include an absolute location identification, wherein the API comprises a portion arranged to convert the absolute location identification to an area identification, wherein the portion arranged to compare the location cues is arranged to compare the area identification to area identifications stored in the database.

7. The API of claim 6, wherein each of the area identifications is represented by a C-Square string.

8. The API of claim 1, wherein if two or more of the location cues correspond to different place IDs stored in the database, the API comprising a portion arranged to merge the different place IDs into one place ID, wherein the portion arranged to return the previously discovered place ID returns the one place ID.

9. A method of providing location information to a Location Based Service (LBS), the method comprising acts of:
   receiving location cues from a device as a portion of a request for location information;
   comparing the location cues to a database of location cues;
   returning a location query page associated with a new place ID if the location cues do not correspond to the database location cues; and
   returning a previously discovered place ID associated with the database location cues and associating any of the location cues that do not correspond to database location cues with the previously discovered place ID if one or more of the location cues correspond to one or more of the database location cues.

10. The method of claim 9, comprising an act of expanding the location cues and comparing the expanded location cues to the database location cues, wherein the act of returning the previously discovered place ID associated with the database location cues comprises an act of returning the previously discovered place ID if one or more of the expanded location cues correspond to one or more of the database location cues.

11. The method of claim 9, comprising an act of sharing the place ID with a further device in response to a location request from the further device that includes one or more location cues that correspond to one or more of the database location cues that correspond to the place ID.

12. The method of claim 9, wherein the device is associated with a user and wherein the database location cues include temporal cues related to a time of acquiring the database location cues and user identification information identifying the user associated with the database location cues, the method comprising an act of sharing the place ID with a further device of the user in response to a location request from the further device that includes temporal cues that are within a predetermined time of one or more of the database temporal cues.

13. The method of claim 9, wherein the location cues include a context, wherein the act of returning the previously discovered place ID comprises an act of returning the place ID at a location resolution determined from the context.

14. The method of claim 9, wherein the location cues include an absolute location identification, the method comprising an act of converting the absolute location identification to an area identification, wherein the act of comparing the location cues comprises an act of comparing the area identification to area identifications stored in the database.

15. The method of claim 14, wherein each of the area identifications is represented by a C-Square string.

16. A device for accessing a Location based Service (LBS), the device comprising:
   a memory;
   a display; and
   a processor operably coupled to the memory and the display, wherein the memory configures the processor to:
      provide a user interface (UI) on the display;
      retrieve location cues in response to a location request;
      forward location cues to a location server; and
      receive location information back from the location server, wherein the location information is a location query page associated with a new place ID if the location cues do not correspond to the location server cues and wherein the location information is a previously discovered place ID associated with the server location cues if one or more of the location cues correspond to one or more of the server's location cues.

17. The device of claim 16, wherein the memory configures the processor to:
   store the server location cues and corresponding place IDs in the memory;

query the server location cues stored in the memory prior to forwarding the location cues to the location server; and return a previously discovered place ID associated with the location cues stored in the memory as the location information if the location cues correspond to one or more of the location cues stored in memory.

18. The device of claim 17, wherein the memory configures the processor to associate any of the location cues that do not correspond to location cues stored in the memory with the previously discovered place ID if one or more of the location cues correspond to one or more of the location cues stored in the memory.

19. The device of claim 18, wherein the memory configures the processor to forward to the location server the associated one or more of the location cues that do not correspond to one or more of the location cues stored in the memory.

20. The device of claim 16, wherein the memory configures the processor to convert a location cue that includes absolute location information into a bounding area designation that encompasses the absolute location information.

21. The device of claim 20, wherein the memory configures the processor to:

expand the bounding area designation and compare the expanded bounding area designation to the location cues stored in the memory; and return the previously discovered place ID if the expanded bounding area designation corresponds to one or more of the location cues stored in the memory.

22. The device of claim 16, wherein the location cues include a context, wherein the memory configures the processor to return the previously discovered place ID at a location resolution determined from the context.

23. The device of claim 16, wherein if two or more of the location cues correspond to different place IDs stored in the memory, the memory configures the processor to merge the different place IDs into one place ID and return the one place ID as the previously discovered place ID.

24. The device of claim 16, wherein the device is a cell phone and wherein the LBS is a location aware call log that provides a record of calls placed at the previously discovered place ID.

25. The device of claim 16, wherein the UI includes a web browsing function and wherein the memory configures the processor to forward the previously discovered place ID to a web page currently being viewed by the device such that the web page view is customized based on the previously discovered place ID.

* * * * *